(12) United States Patent
Park et al.

(10) Patent No.: US 6,570,565 B1
(45) Date of Patent: May 27, 2003

(54) 3D GRAPHIC ACCELERATOR AND METHOD FOR PROCESSING GRAPHIC ACCELERATION USING THE SAME

(76) Inventors: Woo Chan Park, 302, 340-3, Yonhui3-dong, Sodaemun-gu, Seoul (KR); Tack Don Han, Mokdong Apt., 922-201, 312, Shinjong-dong, Yangchon-gu, Seoul (KR)

( * ) Notice: Subject to any disclaimer, the term of this patent is extended or adjusted under 35 U.S.C. 154(b) by 187 days.

(21) Appl. No.: 09/630,650

(22) Filed: Aug. 2, 2000

(30) Foreign Application Priority Data

Jun. 24, 2000 (KR) ........................ P2000-35095

(51) Int. Cl.[7] .............................................. G06T 15/40
(52) U.S. Cl. ...................................................... 345/421
(58) Field of Search ............................... 345/419, 539, 345/536, 546, 545, 422, 592, 589, 441, 619, 421, 581

(56) References Cited

U.S. PATENT DOCUMENTS 5,923,333 A * 7/1999 Stroyan ........................ 345/422
6,028,608 A * 2/2000 Jenkins ........................ 345/619
6,326,964 B1 * 12/2001 Snyder et al. ............... 345/419

* cited by examiner

Primary Examiner—Mark Zimmerman
Assistant Examiner—Kimbinh T. Nguyen
(74) Attorney, Agent, or Firm—Sheridan Ross PC

(57) ABSTRACT

A 3D graphic accelerator and a method for processing a graphic acceleration using the same is provided in which the inputted primitives are geometrically processed, and existence of any transparent primitives or dominance/rarity of opaque primitives is determined among the geometrically processed primitives. The primitives are rendered in an object-order style and an image-order style in accordance with the determination. The information on the rendered primitives is stored in a corresponding frame buffer and a bucket, and the rendered primitives are display-refreshed. Thus, the 3D graphic accelerator with order- independent transparency and high performance is obtained.

11 Claims, 7 Drawing Sheets

3D GRAPHIC ACCELERATOR AND METHOD FOR PROCESSING GRAPHIC ACCELERATION USING THE SAME

BACKGROUND OF THE INVENTION

1. Field of the Invention

The present invention relates to a 3 dimensional (D) graphic accelerator and a method for processing a graphic acceleration using the same.

2. Description of the Related Art

In general, 3D computer graphics is a core part of constructing an environment of multimedia. In order to assist in a vivid 3D image, however, an exclusive 3D graphic accelerator of high performance is required. Highly efficient 3D graphic accelerators are introduced these days to PCs and game devices, and active studies are under way for 3D graphic accelerators.

Figure 1:
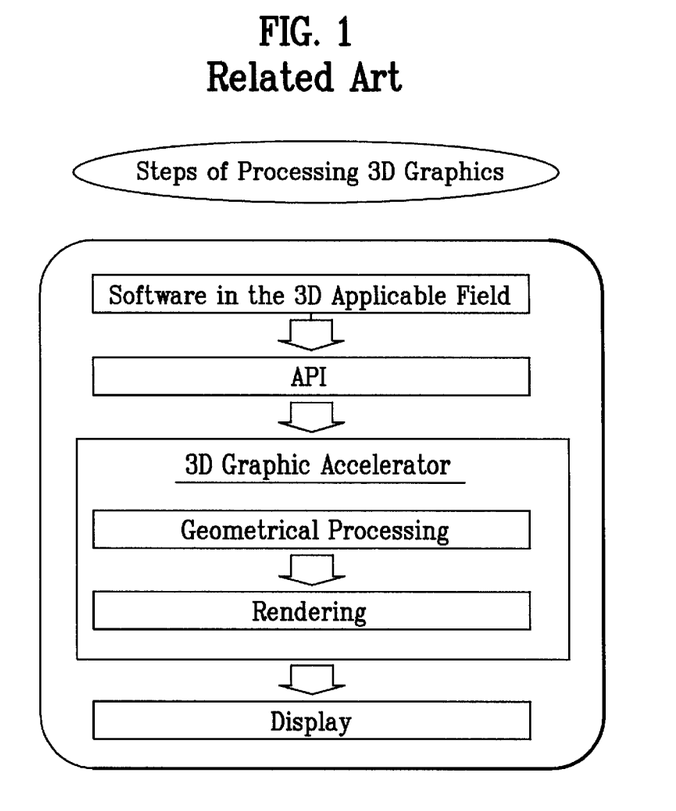
FIG. 1 is a block diagram illustrating the steps of processing the 3D graphics.

FIG. 1 is a block diagram illustrating the processing steps of the 3D graphics. Referring to FIG. 1, the processing steps of the 3D graphics comprises a real-time hardware acceleration by a 3D application software in a 3D graphic accelerator through an application program interface (API), and a transfer of the result to the display.

The above 3D graphic accelerator mainly functions as geometry processing and rendering. The geometry processing is a process of converting an object on a 3D coordinate into a viewpoint, and projecting the viewpoint onto a 2D screen coordinate. The rendering is a process of determining a color value of the 2D coordinate and storing the value in a frame buffer. The color value stored in the frame buffer after processing all the 3D data inputted to one frame is transferred to a display, which is called a "display refresh." In general, a geometry processing section and a rendering section are pipelined to enhance their performance.

The 3D graphic accelerators are roughly divided into two styles of following an order of inputted primitives, i.e., an object-order style and an image-order style.

The primitives here refer to dots, lines and polygons. In most of the applicable fields in general, polygons occupy most of the primitives. A hardware accelerator is constructed to process the polygons at high speed.

The object-order style is a style that the objects are transferred to a display in the order of primitives after undergoing the geometrical process and rendering process. The object-order style is advantageous for high performance because it can pipeline the geometrical process and the rendering process performed per primitive.

For a hidden surface removal, however, the object-order style needs to have a depth buffer (z-buffer) and a color-buffer corresponding to a full screen. For an overlap of the rendering process and the display refresh, two z-buffers and two color buffers are required. This is called a double buffering. Most of the 3D graphic accelerators currently being introduced to public perform the processing in the object-order style.

The image-order style is not a style of processing the image in the order of primitives but of processing the primitives at the corresponding positions of the images in the order of the positions.

Assuming that the start point of the screen is (0, 0) and the end point is (n−1, m−1), for instance, all of the related primitives at the position of (0, 0) are searched for calculation of color values. The same process is repeated in the given order until reaching to the position of (n−1, m−1). This necessitates a buffer that has a pipeline of the geometrical process and the rendering process for entire primitives and all the information on the geometrically processed primitives. Since only a part of the screen rather than a full screen is required for the hidden surface removal, the image-order style is more advantageous for lowering the price than for enhancing the performance. The 3D graphic accelerator of this style had been mainly adopted in the past.

Figure 2:
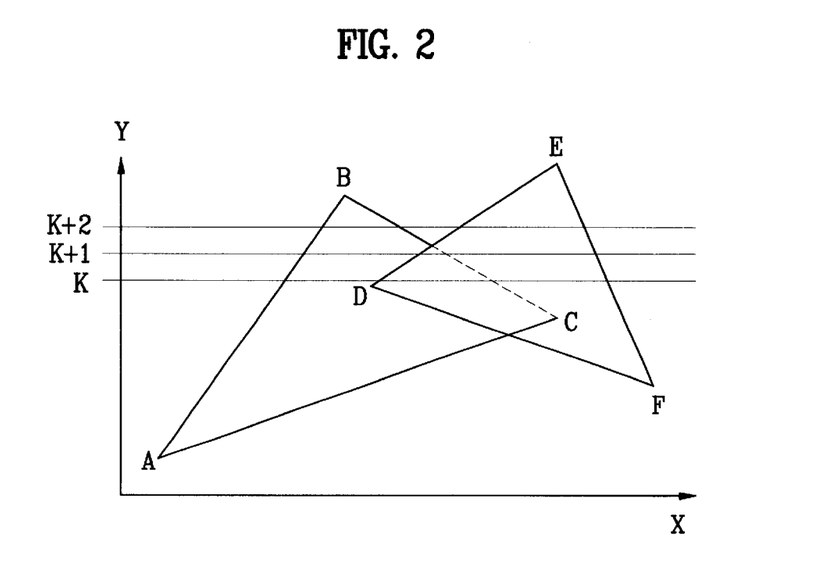
FIG. 2 is a block diagram illustrating the order of processing the primitives inputted to a 3D graphic accelerator.

The following is a comparative explanation between the object-order style and the image-order style made with reference to FIG. 2.

FIG. 2 shows triangles consisting of A, B, C and D, E, F. Assume that, of the two triangles, the one consisting of A, B, C is defined earlier than the one consisting of D, E, F and first inputted to the 3D graphic accelerator. According to the object-order style, the information on colors and depths generated from the geometrical process and the rendering process through a 3D graphic pipeline with respect to the triangle consisting of A, B, C is stored in a frame buffer. As a next step, information on the colors and the depths is calculated in the geometrical process and the rendering process with respect to the triangle consisting of D, E, F. The calculated information is compared with the information on the depths of the triangle A, B, C already stored with respect to the overlapping interval, and the information closer to the viewpoint is selected and stored. FIG. 2 shows an occasion where an overlapping interval exists with respect to the two triangles and the one consisting of D, E, F is closer to the viewpoint than the one consisting of A, B, C with respect to the overlapping interval.

According to the image-order style, the processing order of the triangles depends on the position of the image currently being processed.

For instance, if the position currently being processed according to the image-order style in FIG. 2 is the $k^{th}$ scan-line, the values in the X axis are processed in a reverse order of the numerical values. Subsequently, all the triangles corresponding to the pixel currently being processed are searched irrespective of an input order of the triangles, and the one closest to the viewpoint is selected for calculation of the ultimate color values. In other words, when the value in the X axis is the $k^{th}$ scan-line, the triangle consisting of A, B, C is processed within the interval corresponding to the triangle consisting of A, B, C except within the overlapping interval. Of the two triangles, the position closer to the viewpoint (the triangle consisting of D, E, F in FIG. 2) is searched and processed within the overlapping interval. The triangle consisting of D, E, F is processed in the remaining interval corresponding to the triangle consisting of D, E, F.

Figure 3:
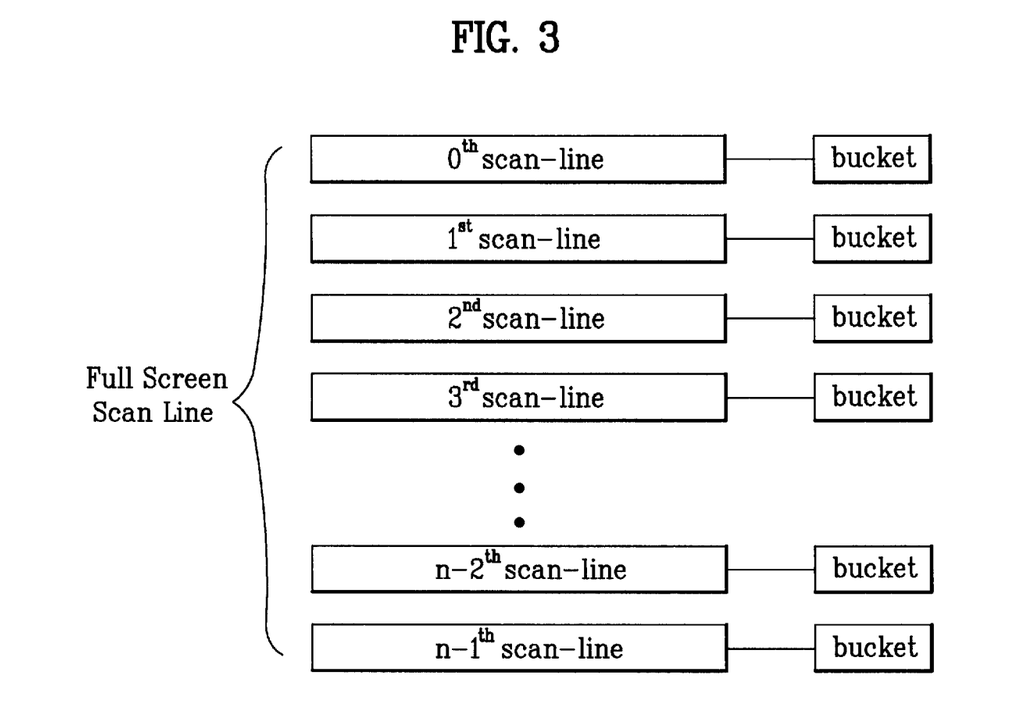
FIG. 3 is a block diagram illustrating the rendering of scan-line in the image-order

Meanwhile, the most outstanding image-order style is a scan-line style, as shown in FIG. 3.

Still referring to FIG. 3, in the geometrical process, all the primitives are geometrically processed according to the viewpoint, and are transferred to the position on the screen. The pertaining information is stored in buckets existing per scan-line. This means that the buckets are supposed to have all the information pertaining to the primitives corresponding to the corresponding scan-lines. This is called a "bucket sorting." Such a bucket sorting is a part to be processed by a geometrical processing section or a separate device. The rendering process is performed upon completion of the geometrical process and storage of the information pertaining to all the primitives in the buckets existing per scan-line. The rendering process is performed in a predetermined order of scan-lines.

Assume that the rendering process is performed from the $0^{th}$ scan-line to the final $n-1^{th}$ scan-line, as illustrated in FIG.

3, for instance, and the currently being processed scan-line is the $k^{th}$, and the (x, y) position on the screen of the $k^{th}$ scan-line begins from (0, k) and ends with (m, k). Then, the primitives corresponding to the position (0, k) is first searched from the buckets and the one closest to the viewpoint is selected for calculation of an ultimate color value, according to the scan-line style. If such a process is performed to the (m, k) position, the rendering process per scan-line is completed, and the information rendered on a scan-line is transferred for a display refresh. The same process is performed with respect to the $k^{+1}$th scan-line, which corresponds to the next scan-line, and to the entire scan-lines.

The following are the characteristic features of the image-order style.

First, a huge memory space is required to retain information in buckets allotted per scan-line in proportion to an increase of the number of primitives.

Second, whereas the object-order style requires a z-buffer for a full screen, the scan-line style requires a z-buffer corresponding to the scan-line only.

Third, the information on all the primitives corresponding to each pixel is available from the buckets allotted per scan-line. In particular, the order of primitives is available with respect to the viewpoint. Therefore, the image-order style can provide an order-independent transparency.

The order-independent transparency plays a very significant role in the 3D graphic accelerator because a transparent primitive is critical for generation of a vivid 3D graphic image. However, an order-dependency problem is raised when processing a transparent primitive.

The following is a more detailed explanation in that regard.

Figure 4:
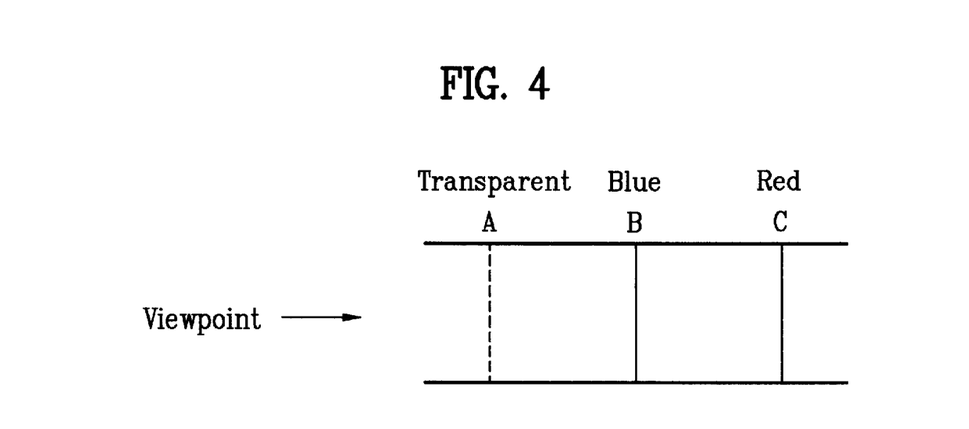
FIG. 4 is a block diagram illustrating the order-independent transparency.

FIG. 4 is an example showing the order-dependency problem caused when a plurality of primitives are stretched over one pixel. Assume that A is transparent, B is blue and opaque, and C is red and opaque. When the ultimate color value needs to be blue in that case, the order-dependency problem is raised if the primitives are inputted in the order of C-A-B, as shown in FIG. 4. In other words, when C is inputted first, the color value becomes red. When A is inputted next, the color value becomes red due to its transparency. When B is inputted next, B is discarded because A is the closest to the viewpoint. Thus, the ultimate color value becomes red.

This problem of order-dependency can be solved by the image-order style owing to its structural merits because it stores the information on the entire primitives stretched over each pixel. To be specific, even if the primitives are inputted in the order of C-A-B, as mattered in the object-order style, the image-order style stores the information on C, A, B in the buckets, and processes the primitives in the order of C-B-A in the rendering process so as to calculate a correct color value.

However, the image-order style also poses a problem of being incompatible with a 3D graphic accelerator of high performance. While having a merit of processing the 3D graphics at high speed, the object-order style fails to provide an order-independent transparency due to processing of the graphics in the order of input of the primitives. On the other hand, the image-order style provides an order-independent transparency owing to processing of the primitives in the order of positions of each image corresponding to a primitive. However, the image-order style still fails in a speed.

SUMMARY OF THE INVENTION

To solve the above problems, an object of the present invention is to provide a 3D graphic accelerator of high speed and a method for processing a graphic acceleration using the same To achieve the above object, a method for processing a graphic acceleration using the 3D graphic accelerator according to the present invention comprises the following steps: a first step of geometrically processing the inputted primitives; a second step of determining an existence of any transparent primitives among the geometrically processed ones or a dominance/rarity of opaque primitives; a third step of rendering the primitives determined in the second step in the object-order style and the image-order style to store the rendered information thereon in the corresponding frame buffers and buckets, respectively; and a fourth step of display-refreshing the rendered primitives.

If any transparent primitives among the geometrically processed ones are determined to exist or/and opaque primitives are determined to be dominant at the third step, the third step is further divided into the following sub-steps of: (a) bucket-sorting so that the information on a part of the opaque primitives or/and the transparent primitives can be stored in the corresponding first bucket, respectively, and (b) storing the information in the first frame buffer after rendering remainders of the opaque primitives in the object-order style; (c) determining as to completion of the bucket-sorting and the rendering in the object-order style of the remainders of the opaque primitives; and (d) rendering a part of the bucketed opaque primitives or/and transparent primitives in the image-order style, when the rendering in the object order style of the remainders of the opaque primitives is determined to have been completed, and (e) comparing the values between the information rendered in the image-order style and in the object-order style to store the resultant value in the first frame buffer.

While rendering a part of the bucketed opaque primitives or/and transparent primitives in the image-order style, for a determination of completion of the performance in the above sub-steps, an existence of any transparent primitives among the geometric primitives that are inputted or a dominance/rarity of the opaque primitives is determined. Bucket-sorting is performed upon determination of the dominance/rarity of the opaque primitives so that the information on the part of the opaque primitives or/and transparent primitives can be stored in the corresponding second bucket, respectively. The remainders of the opaque primitives are rendered in the object-order style and the pertaining information is stored in the second frame.

If no transparent primitive among the geometrically processed ones is determined to exist and opaque primitives are determined to be rare at the third step, the third step is further divided into the following sub-steps: storing the information in the second frame buffer after rendering the information on the opaque primitives in the object-order style; determining as to completion of the rendering in the object-order style; and rendering the bucketed opaque primitives in the image-order style when the rendering is determined to have been completed.

BRIEF DESCRIPTION OF THE DRAWINGS

Other objects, characteristic features and advantages of the present invention will now become apparent with a detailed description of an embodiment made with reference to the accompanying drawings, in which.

DETAILED DESCRIPTION OF PREFERRED EMBODIMENTS

The following is a detailed description of a preferred embodiment of the 3D graphic accelerator and the method for graphic acceleration using the same according to the present invention made with reference to the accompanying drawings.

The currently available 3D graphic accelerators of high performance employ the object-order style in most cases. However, the object-order style poses a problem of order-dependent transparency with respect to the transparent primitives. On the other hand, the image-order style provides an order-independent transparency. However, it still fails to achieve a high performance due to its structural characteristics.

The present invention therefore provides a high performance for the object-order style as well as an order-independent transparency for the image-order style by combining the two styles.

The present invention also enables an image-order processing section to share the workload of an object-order processing section when the transparent primitives are too rare or nil in a particular applicable field for the image-order processing section to perform the task.

Figure 5:
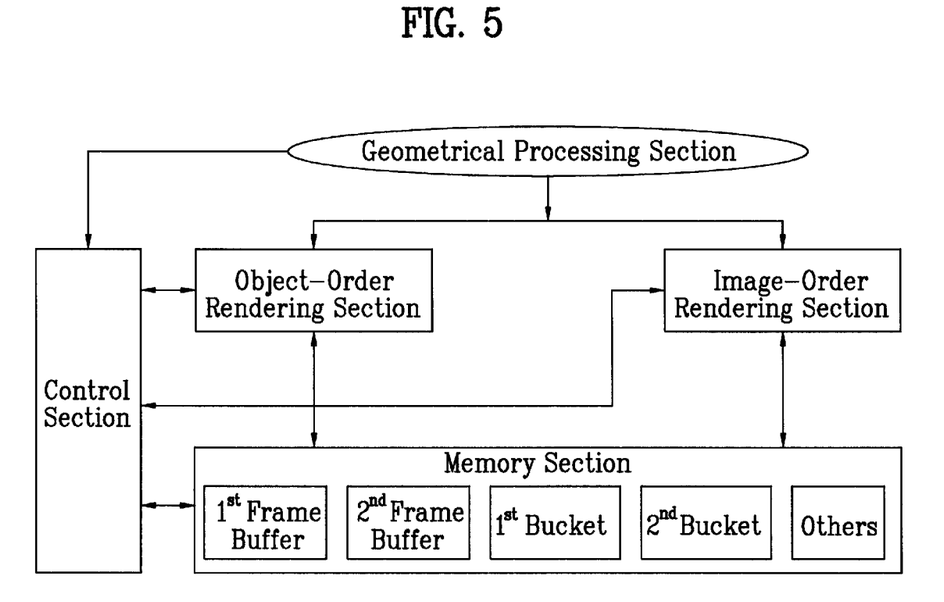
FIG. 5 is a block diagram showing the constitution of a 3D graphic accelerator according to the present invention.

FIG. 5 shows a constitution of the 3D graphic accelerator according to the present invention.

Referring to FIG. 5, the present invention mainly comprises a geometrical processing section, an object-order rendering section, an image-order rendering section, a control section and a memory section.

The memory section here comprises a first frame, a second frame, a first bucket, a second bucket and other memories. The other memories include a memory for mapping such as a texture mapping, bump mapping, reflection mapping, etc.; a working memory used for the 3D graphic accelerator per se; and a memory for diverse kinds of buffering.

Of the constitutional elements of the present invention, the geometrical processing section performs a geometrical processing with respect to the inputted primitives, while the control section determines an existence of any transparent primitives among the geometrically processed ones or a dominance/rarity of the opaque primitives.

The control section not only determines where to send the geometrically processed primitives between the image-order processing section and the object-order processing section but also controls a pipeline of the object-order rendering section and the image-order rendering section. The control section especially controls mutual exchange of the frame buffers used by the object-order rendering section with the buckets used by the image-order rendering section upon completion of the performance with respect to each frame.

The object-order rendering section renders a part or all of the opaque primitives among the geometrically processed primitives. The image-order rendering section renders all of the transparent primitives among the geometrically processed ones, or/and renders a part of the opaque primitives in the order of images.

The first and the second frame buffers store the result of the object-order rendering, while the first and the second buckets store the result of the image-order rendering.

The following is an explanation of the processing of a graphic acceleration performed by the 3D graphic accelerator according to the present invention.

Figure 6:
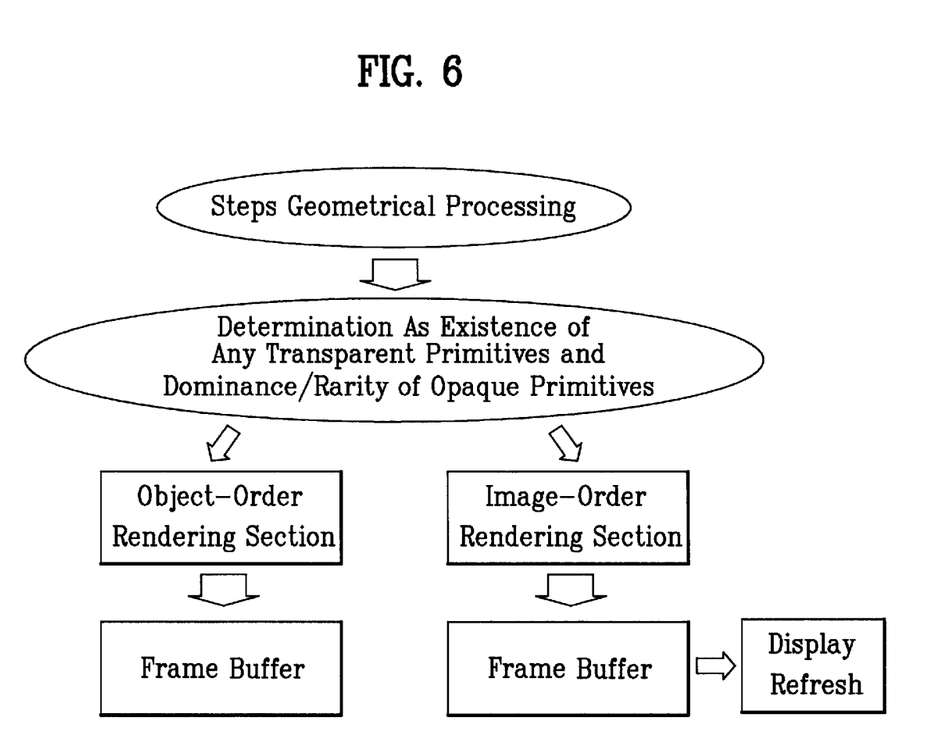
FIG. 6 is a block diagram illustrating the steps of processing the graphic acceleration in a 3D graphic accelerator according to the present invention.

As shown in FIG. 6, the first-inputted primitives undergo a geometrical processing. Based on the geometrically processed primitives, an existence of any transparent primitives or a dominance/rarity of the opaque primitives is determined.

If opaque, the geometrically processed primitives are transferred to the object-order rendering section. If transparent, the geometrically processed primitives are transferred to the image-order rendering section. If the opaque primitives are dominant and causes an overload to the object-order rendering section, not only an existence of any transparent primitives but also a dominance/rarity of the opaque primitives are determined so that the overload can be shared by the image-order rendering section.

Subsequently, the object-order rendering section and the image-order rendering section perform rendering with the respective frame buffers. If the object-order rendering section is rendering the $N^{th}$ frame, the image-order rendering section processes the $N-1^{th}$ frame. The image-order rendering section then performs a display refresh of the rendered image.

Figure 7A:
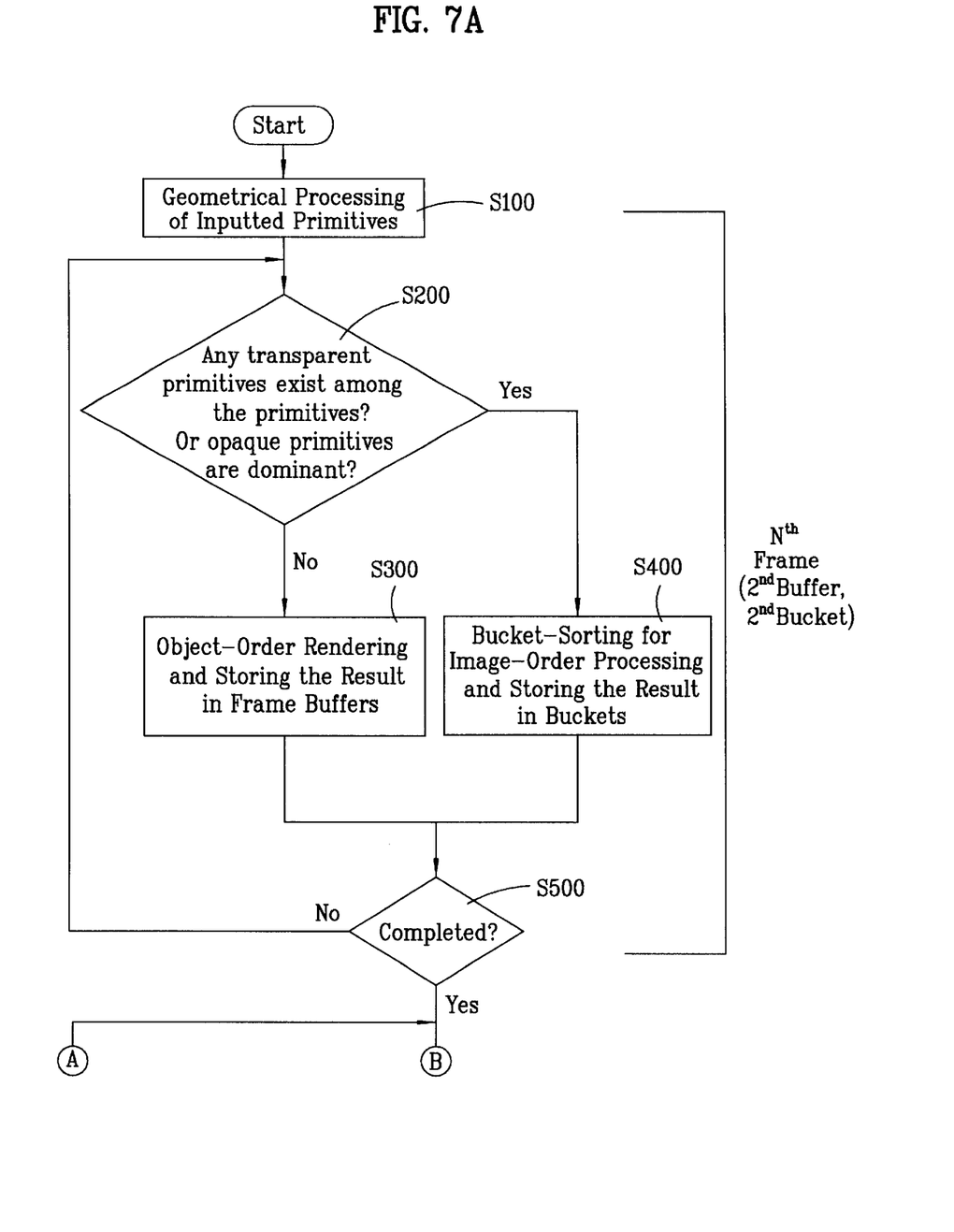
FIGS. 7a and 7b is a flow chart illustrating the steps of processing in FIG. 6.
Figure 7B:
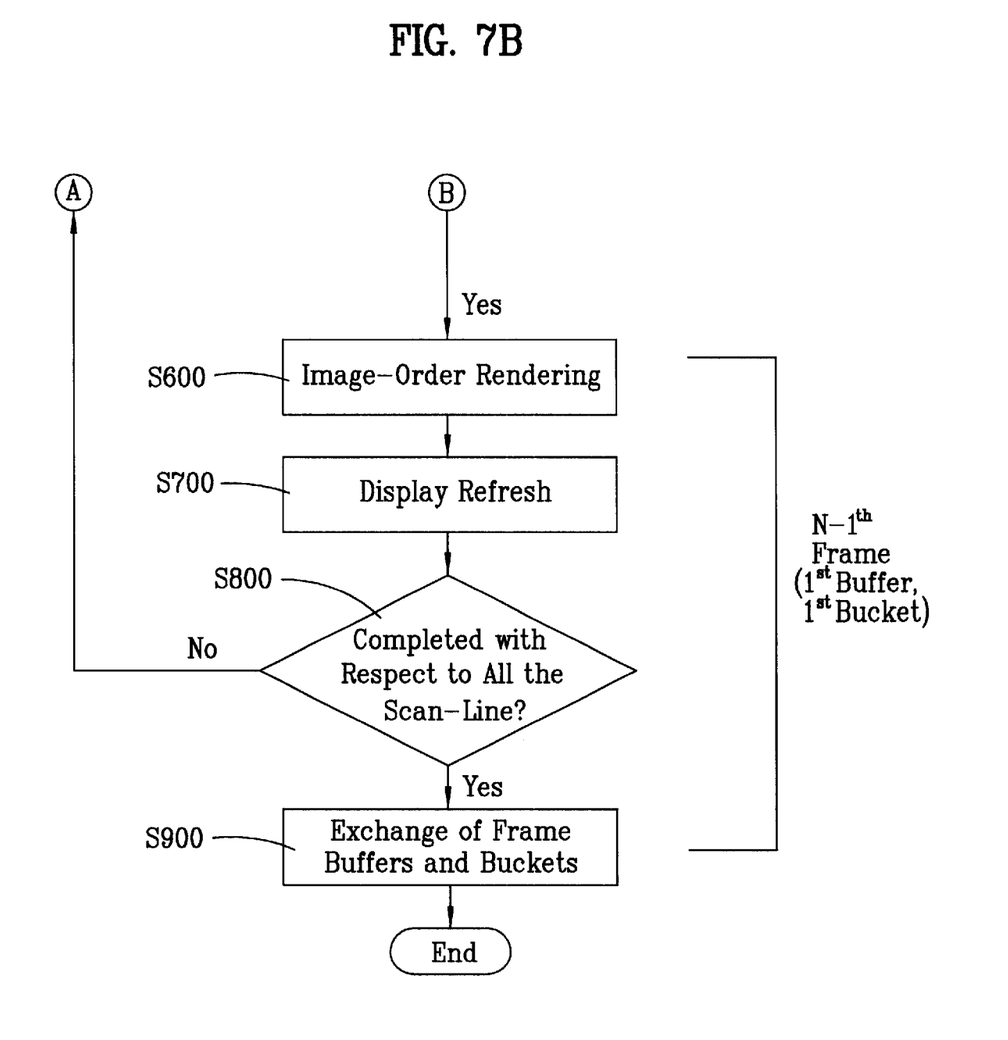

FIG. 7 shows a more detailed description of the method for processing a graphic acceleration using the 3D graphic accelerator according to the present invention.

Referring to FIG. 7, the primitives inputted from the geometrical processing section are geometrically processed (S100). The control section determines an existence of any transparent primitives or a dominance/rarity of the opaque primitives (S200).

For example, if the geometrically processed primitives are determined to be partially transparent and partially opaque, the control section transfers the transparent primitives to the image-order rendering section, and transfers the opaque primitives to the object-order rendering section.

If the opaque primitives are determined to be dominant, the control section transfers a part of the opaque primitives to the image-order rendering section for a speedy graphic acceleration. If the opaque primitives are determined to be rare, the object-order rendering section renders all the opaque primitives. Of course, the standard for determination as to the dominance/rarity of the opaque primitives is variable depending on the circumstances.

Determination as to not only an existence of any transparent primitives but also a dominance/rarity of opaque primitives enables the 3D graphic accelerator a high performance by sharing the workload of the object-order rendering section with the image-order rendering section.

The object-order rendering section renders a part or all of the opaque primitives among the geometrically processed primitives (S300). To be specific, if the opaque primitives are determined to be rare among the geometrically processed ones, the object-order rendering section renders all of the opaque primitives. If the opaque primitives are determined to be dominant, the object-order rendering section renders only a part of the opaque primitives. The result of the rendering is stored in the first frame buffer.

The image-order rendering section buckets all of the transparent primitives or/and a part of the opaque primitives among the geometrically processed ones for rendering in the image-order style. The result of the bucket-sorting is stored in the first bucket.

Completion of the object-order rendering and bucket-sorting is subsequently determined (S500).

If determined to have been completed, a part of the bucketed opaque primitives and all of the transparent primitives are rendered in the image-order style. The z-value of the primitives rendered in the image-order style is compared with that of the primitives rendered in the object-order style. The results of the comparison is stored in the first frame buffer (S600).

Here in step S600, the image-order rendering is performed in the scan-line style; i.e., an activation of step S600 output a scan-line.

If the object-order rendering and bucket-sorting are determined not to have been completed (S500), the control section further determines an existence of any transparent primitives or a dominance/rarity of the opaque primitives (S200).

While the image-order rendering is performed with respect to the first frame buffer (S600) and the first bucket stores the information on the N−1$^{th}$ frame, the primitives of the N$^{th}$ frame, which is adjacent to the N−1$^{th}$ frame, is inputted to the geometrical processing section, as shown in FIG. 7A, to subsequently perform the aforementioned geometrical processing step (S100), and, the object-order rendering (S300) and the bucket-sorting (S400) at the same time.

In the course of processing the N$^{th}$ frame, the information on the primitives that have undergone the object-order rendering and the image-order rendering is stored in the second frame buffer and the second bucket, respectively.

In short, the object-order rendering (S300) and the image-order rendering (S600) process different frames except the first and the last frames.

The rendered primitives are then display-refreshed (S700).

Subsequently, a test for completion of the display-refresh with respect to all the scan-lines for the first frame buffer is determined (S800).

If determined to have been completed, the first frame buffer and the first bucket are mutually exchanged with the second frame buffer and the second bucket as the final step (S900).

The "exchange" here means as follows. The first frame buffer and the first bucket are used for display refresh of all the information on the N−1$^{th}$ frame that is subsequently stored in the first frame buffer (S600). Then the first bucket, at the present display refresh section (S700), is used for storing the information on the primitives with respect to the N+1$^{th}$ frame by the rendering section (step S300). Additionally, the second frame buffer and the second bucket are used for storing the information on the primitives with respect to the N$^{th}$ frame rendered by the rendering section (steps S300 and S400) that are then used for display refresh (S700) of all the information on the N$^{th}$ frame.

Such an exchange can be realized by means of a simple multiplexer or a switch. The characteristic features of the present invention comprising the graphic acceleration process described above can be more clearly understood by being compared with the conventional rendering process.

Figure 8:
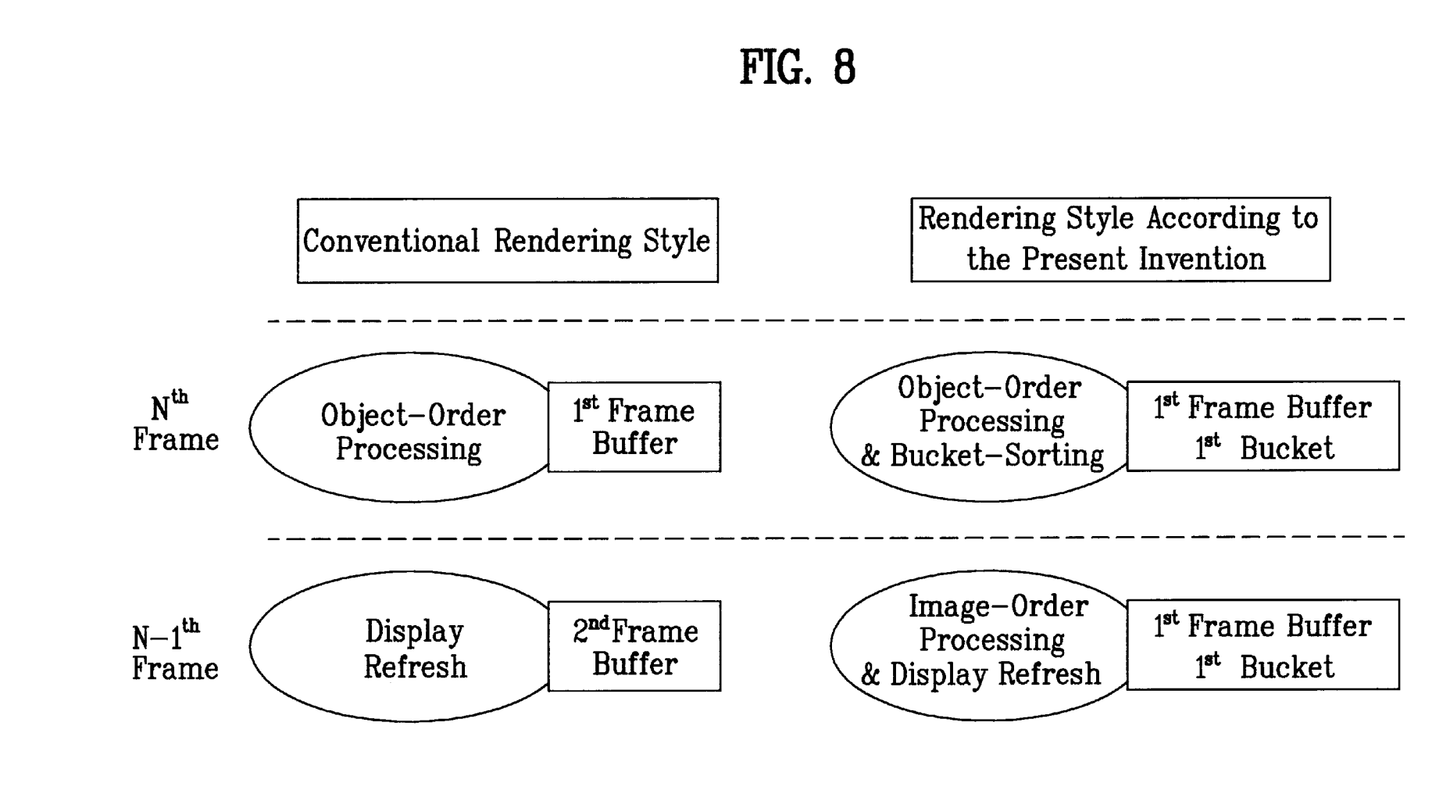
FIG. 8 is a comparative diagram between the conventional rendering process and the rendering process according to the present invention.

FIG. 8 is a block diagram comparing the rendering process according to the present invention with the conventional rendering process. FIG. 8 shows that the conventional rendering process is performed by a rendering section in the object-order style with the first frame buffer and by display refresh with the second frame buffer at the same time.

If the object-order processing section is processing the N$^{th}$ frame, the display refresh section processes the N−1$^{th}$ frame. Upon completion of the object-order processing and the display refresh, the first and the second frame buffers are mutually exchanged so that the display refresh section can use the frame buffer having the information on the N$^{th}$ frame and the object-order processing section can process the N+1$^{th}$ frame. By doing so, the object-order processing section and the display refresh section perform the task through overlapping in parallel.

Two frame buffers and two buckets are required for the object-order rendering and the image-order rendering, respectively, according to the present invention.

The following is an explanation of the rendering according to the present invention.

The object-order rendering (S300) is performed by means of the first frame buffer, and the bucket-sorting (S400) is performed by means of the first bucket for the image-order rendering (S600) in the N$^{th}$ frame. The image-order rendering (S600) is performed by means of the second bucket for processing of the N−1$^{th}$ frame. The display refresh (S700) is performed by means of the second frame buffer.

Upon completion of all the tasks with respect to the given frames, the first and the second frame buffers are mutually exchanged so that the display refresh section can use the frame buffer having the information on the N$^{th}$ frame. The N+1$^{th}$ frame is processed in the object-order style.

Also, the bucket having the information on the N$^{th}$ frame is used in the image-order processing section by mutually exchanging the first and the second buckets. The bucket-sorting section buckets the N+1$^{th}$ frame. The processing is thus overlapped in parallel.

As described above, the 3D graphic accelerator and the method for processing a graphic acceleration using the same provide a high performance as well as an order-independent transparency, which are respective merits of each style, by combining the two.

Also, even when the transparent primitives are too rare or nil for the image-order processing section to perform the task in a particular applicable field, the workload of the object-order processing section is shared by the image-order processing section in the 3D graphic accelerator according to the present invention to achieve high speed and high performance.

The above description will enable one skilled in the art to modify and revise the invention within the spirit not degrading the technical concept of the present invention.

However, the technical scope of the present invention is not limited to the above description of the embodiment but shall be determined by the claims.

What is claimed is:

1. A 3D graphic accelerator, comprising:
 a geometrical processing section for geometrically processing inputted primitives;

a control section for determining as to existence of any transparent primitives or dominance/rarity of opaque primitives among said geometrically processed primitives;

an object-order rendering section for rendering a part or all of said opaque primitives among said geometrically processed primitives in an object-order style;

an image-order rendering section for rendering all of said transparent primitives or/and a part of said opaque primitives among said geometrically processed primitives in an image-order style;

a memory including a plurality of frame buffers for storing information from said object-order rendering section, and a plurality of buckets for storing information from said image-order rendering section;

wherein if said control section determines an existence of one or more of: transparent primitives and a dominance of opaque primitives among said geometrically processed primitives, then (a) and (e) following occur:

(a) said image-order rendering section performs a step of bucket-sorting for storing information on a part of said opaque primitives and at least one transparent primitive in a corresponding first bucket of said plurality of buckets; and (b) said object-order rendering section performs a step of rendering remainders of said opaque primitives in a first frame buffer of said plurality of frame buffers for storing the information thereon in a first of said plurality of frame buffers;

(c) said control section performs a step of determining as to completion of said bucket-sorting and object-order rendering;

(d) said image-order rendering section performs a step of rendering a part of said bucketed opaque primitives or transparent primitives in said image-order style, if said steps of bucket-sorting and object-order rendering are determined to have been completed; and (e) comparing the information rendered in said image-order style with the information rendered in said object-order style to store a resultant value in said first frame buffer.

2. The 3D graphic accelerator of claim 1, wherein said control section is characterized by controlling a mutual exchange of information between said frame buffers and said buckets in said memory section, and controlling a pipeline of said object-order rendering section and said image-order rendering section.

3. A method for processing a graphic acceleration by means of a 3D graphic accelerator, comprising:

a first step of geometrically processing inputted primitives;

a second step of determining at least one of (i) and (ii) following: (i) an existence of a transparent primitive and (ii) one of a dominance and a rarity of opaque primitives among said geometrically processed primitives;

a third step of rendering said primitives in an object-order style and an image-order style in accordance with a result from said second step of determining, and storing information ($I_1$) on primitives rendered in an object-order style in a first frame buffer, and information ($I_2$) on primitives rendered in an image-order style in a bucket, respectively; and a fourth step of display-refreshing said rendered primitives;

wherein said third step includes the sub-steps (a) through (e) following if said second step determines of one or more of: an existence transparent primitives, and a dominance of opaque primitives among said geometrically processed primitives:

(a) bucket-sorting for storing, in a first bucket, the information $I_2$ on: a part of said opaque primitives, and said transparent primitives;

(b) rendering, in the object-order style, a remainder of said opaque primitives in the first frame buffer for storing the information $I_1$ in the first frame buffer;

(c) determining as to completion of said bucket-sorting step (a), and said object-order rendering step (b);

(d) when said bucket-sorting step (a), and said object-order rendering step (b) are determined to have been completed, rendering the bucketed part of said opaque primitives and said transparent primitives in said image-order style for obtaining resulting information; and (e) comparing (1) and (2) following: (1) the resulting information, rendered in said image-order style, with (2) the information $I_1$ to store a resultant value in said first frame buffer.

4. The method of claim 3, wherein said object-order style and image-order style in said third step process different frames.

5. The method of claim 3, further including an additional step of determining an existence of any of said transparent primitives, or there is a dominance/rarity of opaque primitives among said geometrically processed primitives, wherein said additional step of determining is performed when said bucket-sorting and object-order rendering are determined not to have been completed.

6. The method of claim 3, wherein said second and said resulting information compared between being rendered in said image-order style and being rendered in said object-order style is a depth value.

7. The method of claim 3, wherein while said part of bucketed opaque primitives or/and transparent primitives are rendered in said image-order style, one or more of the steps (A1) through (A3) are performed:

(A1) an instance of said second step of determining is performed;

(A2) a further bucket-sorting step is performed for storing information on a second part of opaque primitives or/and transparent primitives in a corresponding second bucket; and (A3) rendering remainders of said opaque primitives in said object-order style to store information thereon in a second frame buffer.

8. The method of claim 3, wherein said third step is divided into sub-steps if said second step determines non-existence of any transparent primitive or/and rarity of opaque primitives among said geometrically processed primitives, comprising:

rendering information on said opaque primitives in said object-order style, and storing said rendered information in said second frame buffer;

determining as to completion of rendering in said object-order style; and rendering said bucketed opaque primitives in said image-order style if rendering in said-object-order style is determined to have been completed.

9. A method for processing a graphic acceleration by means of a 3D graphic accelerator, comprising:

a first step of geometrically processing inputted primitives;

a second step of determining any existence of transparent primitives or dominance/rarity of opaque primitives among said geometrically processed primitives;

a third step including the substeps of (i) through (iii) following: (i) rendering said primitives in an object-order style and an image-order style in accordance with a result from said step of determining, (ii) storing, in a corresponding frame buffer, information on primitives rendered in said object-order style, and (iii) storing, in a corresponding a bucket, information on primitives rendered in said an image-order style; and a fourth step including the substeps (a) through (c) following:
  (a) display-refreshing said rendered primitives;
  (b) determining a completion of said step of display-refreshing; and
  (c) exchanging said frame buffer and bucket with another frame buffer and another bucket when said display-refreshing is determined to have been completed.

10. The method of claim 9, wherein said step of rendering of said primitives in said image-order style is performed until said step of display-refreshing is determined not to have been completed.

11. A 3D graphic accelerator, comprising:

a geometrical processing section for geometrically processing inputted primitives;

a control section for determining as to existence of one of (a) and (b) following: (a) any transparent primitives, and (b) one of a dominance and a rarity of opaque primitives among said geometrically processed primitives;

an object-order rendering section for rendering a part or all of said opaque primitives among said geometrically processed primitives in an object-order style;

an image-order rendering section for rendering all of said transparent primitives or/and a part of said opaque primitives among said geometrically processed primitives in an image-order style;

a memory including a plurality of frame buffers for storing information from said object-order rendering section, and a plurality of buckets for storing information from said image-order rendering section;

wherein said control section further performs a step of determining a completion of a display refresh;

wherein, when said display refresh is determined to have been completed, said control section controls an exchange of (c) and (d) following: (c) a first of said frame buffers and a first of said buckets with (d) a second of said frame buffers and a second of said buckets, respectively.

* * * * *